United States Patent [19]

Schroder

[11] Patent Number: 5,394,771
[45] Date of Patent: Mar. 7, 1995

[54] HYDROSTATIC DRIVE, PREFERABLY FOR AN EARTH-MOVING VEHICLE, SUCH AS A WHEEL LOAD

[76] Inventor: Klaus Schroder, Breitenweg, 7951 Kirchdorf/Iller, Germany

[21] Appl. No.: 978,146

[22] Filed: Nov. 16, 1992

Related U.S. Application Data

[63] Continuation of Ser. No. 785,294, Oct. 30, 1991, abandoned.

[30] Foreign Application Priority Data

Oct. 31, 1990 [DE] Germany .......................... 40 34 689.7

[51] Int. Cl.$^6$ ............................................. F16H 37/06
[52] U.S. Cl. ........................................ 74/661; 74/665 B
[58] Field of Search ................. 74/661, 665 B, 665 Q; 60/484, 485, 420

[56] References Cited

U.S. PATENT DOCUMENTS

| | | | |
|---|---|---|---|
| 2,380,889 | 7/1945 | Waseige | 74/661 OR |
| 3,503,278 | 3/1970 | Livezey | 74/661 OR |
| 3,734,257 | 5/1973 | Eastcott et al. | 74/661 X |
| 3,757,912 | 9/1973 | Ball, Jr. et al. | 74/661 X |
| 4,315,439 | 2/1982 | Grachtrup | 74/661 OR |
| 4,392,393 | 7/1983 | Montgomery | 74/665 B X |
| 4,819,507 | 4/1989 | Pescher | 74/665 Q X |

FOREIGN PATENT DOCUMENTS 1530899 8/1970 Germany .
2161603 6/1973 Germany .

OTHER PUBLICATIONS

Hydrotatic Transmission Systems, by J. Korn, Published 1969, pp. 4–6.

*Primary Examiner*—Dirk Wright

[57] ABSTRACT

The invention relates to a hydrostatic drive, preferably for an earth-moving vehicle, such as a wheel loader, comprising two reciprocating-piston rotary motors of the inclined-axis or inclined-disk type. The reciprocating-piston rotary motors have an angle of inclination which are adapted to be controlled to decrease toward zero as the torque decreases and the velocity increases, and which each is coupled to an input shaft of a shiftable transmission. The shiftable transmission comprises two input shafts, which are coupled to two reciprocating-piston rotary motors, and each input shaft is adapted to be coupled to a common output shaft by means of one of at least two shiftable gear stages.

8 Claims, 3 Drawing Sheets

HYDROSTATIC DRIVE, PREFERABLY FOR AN EARTH-MOVING VEHICLE, SUCH AS A WHEEL LOAD

This is a continuation of application Ser. No. 07/785,294, filed on Oct. 30, 1991, now abandoned.

BACKGROUND OF THE INVENTION

1. Field Of The Invention

The invention relates to a hydrostatic drive comprising two reciprocating-piston rotary motors of an inclined-axis or inclined-disk type. The reciprocating-piston rotary motors have an angle of inclination which is adapted to be controlled to decrease toward zero as the torque decreases and the velocity increases, and each motor is coupled to one of two input shafts of a shiftable transmission. The hydrostatic drive can preferably be used in an earth-moving vehicle, such as a wheel loader.

2. Description Of The Prior Art

Hydrostatic drives are used for numerous purposes due to their ease of control and their favorable torque speed characteristic. Hydrostatic drives are preferably employed in earth-moving vehicles, such as crawler-type vehicles, wheel loaders, and excavators. A shiftable transmission must provide the required torque throughout the speed range when reciprocating-piston rotary motors succeed a shiftable transmission. As a result, sufficiently powerful and large reciprocating-piston rotary motors are often needed.

SUMMARY OF THE INVENTION

It is an object of the invention to provide a hydrostatic drive which is easily shiftable, which is adapted to provide the required torque throughout the desired speed range, and which may use reciprocating-piston rotary motors that are smaller and less powerful than is required in the prior art.

That object is accomplished in a drive wherein the input shafts of a shiftable transmission are coupled to two reciprocating-piston rotary motors. The input shafts are adapted to be coupled to a common output shaft by means of one of at least two shiftable gear stages. If the drive in accordance with the invention is used, for instance, in a wheel loader, one reciprocating-piston rotary motor will be coupled to the output shaft by means of the first gear stage of the transmission and the second reciprocating-piston rotary motor will be coupled to the output shaft by means of the second gear stage of the transmission as the drive is started so that a correspondingly high starting torque will then be available.

As the velocity (speed of travel) increases, the first reciprocating-piston rotary motor is increasingly tilted so that the torque decreases toward zero. When the first reciprocating-piston rotary motor has an approximately zero inclination, the shiftable transmission can be uncoupled therefrom so that only the second reciprocating-piston rotary motor, which is already coupled to the second gear stage, then accelerates the vehicle to its final velocity.

When a higher torque is also required in the upper velocity range, the first reciprocating-piston rotary motor can be coupled to the second gear stage in a position in which the displacement volume of the first reciprocating-piston rotary motor is zero or almost zero so that the first reciprocating-piston rotary motor delivers power in the upper velocity range even when the first reciprocating-piston rotary motor is correspondingly inclined. Similarly, the second reciprocating-piston rotary motor can be coupled to the first gear stage in the lower velocity range.

In accordance with a preferred feature of the invention, at least one transmission stage is provided between an input shaft of the transmission and a shaft which carries shiftable gears. The transmission stage may effect an increase or preferably a decrease of the speed of the reciprocating-piston rotary motor which is associated with the transmission stage. If the transmission stage effects a speed decrease and if the shiftable transmission associated with each reciprocating-piston rotary motor comprises two stages, a vehicle provided with such a drive can be driven with a high torque by means of both reciprocating-piston rotary motors in the lower speed range and only one reciprocating-piston rotary motor operating with a correspondingly lower transmission ratio will be used for the operation at velocities near the final velocity.

The two reciprocating-piston rotary motors cannot overspeed or race because the motors are suitably coupled to each other by means for preventing a simultaneous tilting of the two motors almost to a zero angle of inclination.

The shifting of the gear stages, which are associated with each reciprocating-piston rotary motor, may be effected by an axial displacement of coupling gears or by multiple-disk couplings. If the shifting is effected by means of shiftable coupling gears, usual synchronizing means can suitably be employed.

A desired transmission, which can be shifted automatically, can be obtained if control means are provided for controlling the angle of inclination of the reciprocating-piston rotary motors dependent on speed and/or pressure. Shifting means are suitably provided for controlling the shifting of the gears dependent on speed and/or torque.

DETAILED DESCRIPTION OF THE PREFERRED EMBODIMENTS

Figure 1:
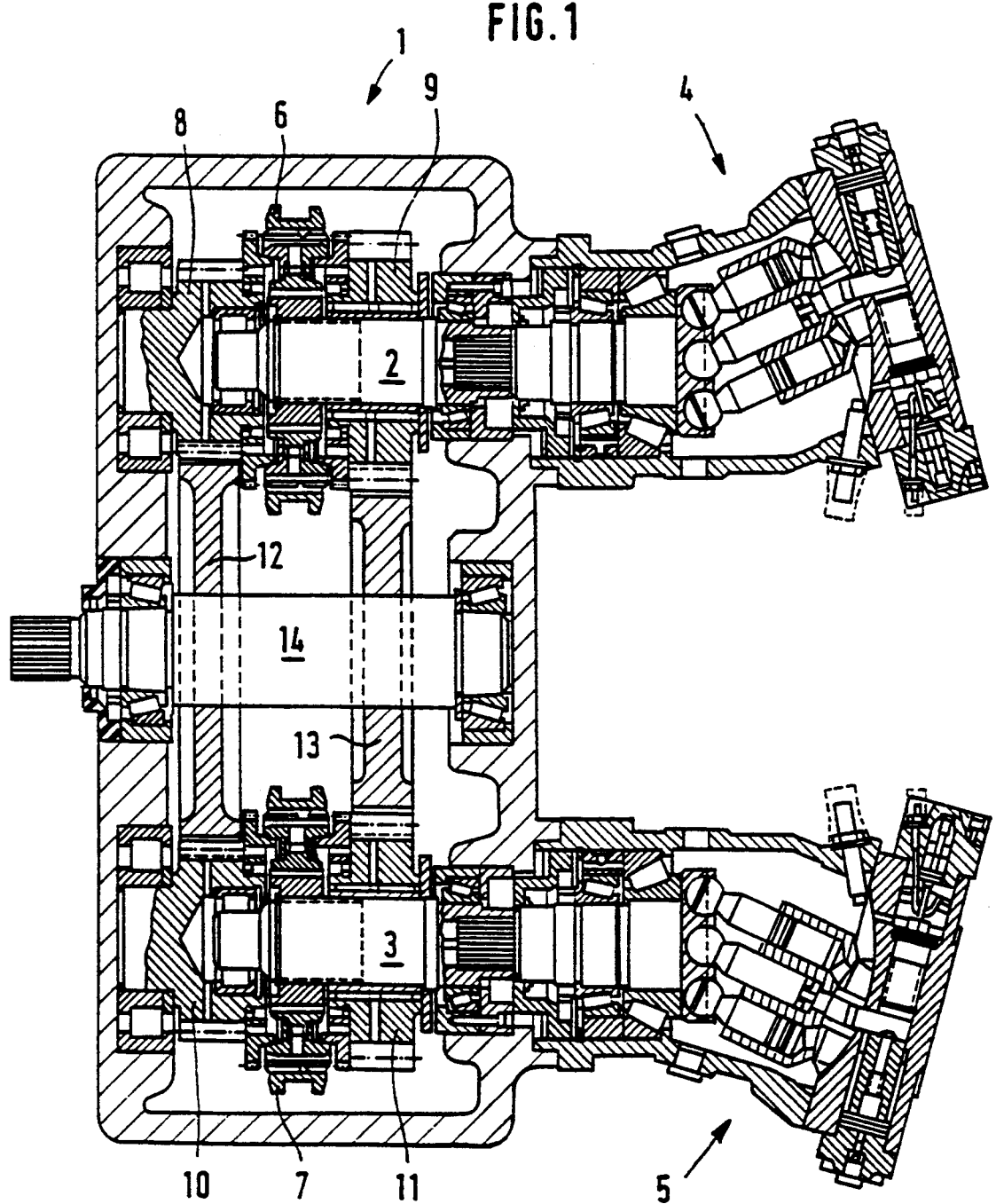
FIG. 1 is a transverse sectional view showing two reciprocating-piston rotary motors of the inclined-axis type, which are coupled to a shiftable transmission and both of which are directly connected to the shafts which carry the shiftable gears.

Illustrative embodiments of the invention will now be explained more in detail with reference to the drawing.

FIG. 1 shows a shiftable transmission 1 that comprises two input shafts 2, 3. Reciprocating-piston rotary motors 4, 5 of the inclined-axis type are coupled to respective ones of said input shafts 2 and 3. Gears 8, 9 and 10, 11, respectively, are adapted to be coupled to the input shafts by conventional gear-shifting means 6 and 7. Said gears respectively mesh with a gear f2 that is larger in diameter and with a gear 13 that is smaller in diameter. The gears 12 and 13 are keyed or otherwise secured to an output shaft 14.

The shifting means 6 and 7 may be moved to shift positions in which none of the gears 8, 9 and 10, 11 are operatively connected to the associated shaft 2 or 3.

The transmission is shifted to the first gear in that the input shaft 2 and/or the input shaft 3 is coupled to the gear 8 and/or the gear 10. The transmission is shifted to the second gear in that the gear 9 and/or the gear 11 is coupled to the shaft 2 and/or the shaft 3.

The reciprocating-piston rotary motors 4 and 5 are provided with controllable tilting means, which are not shown in detail and are operable to change the angle of inclination from the maximum displacement volume $Q_{max}$ almost to zero.

If the transmission shown in FIG. 1 is the drive, e.g., of a wheel loader, automatic tilting and shifting means, not shown in detail, may be used to control said wheel loader as follows:

When a high starting torque is required during the start, the reciprocating-piston rotary motor 5 is connected by the first gear stage 10, 12 to the output shaft 14 and the reciprocating-piston rotary motor 4 is connected by the second gear stage 9, 13 to the output shaft 14. When a velocity of, e.g., 15 km/h has been reached, the reciprocating-piston rotary motor 5 has been tilted to a zero angle of inclination corresponding to a zero displacement volume so that the gear 10 can be shifted to a neutral position and the vehicle is subsequently accelerated to its final velocity only by the reciprocating-piston rotary motor 4 coupled to the second gear stage 9, 13.

Alternatively, the drive can be controlled in that the first gear stage 10, 12 is initially operated by the reciprocating-piston rotary motor 5 and the second gear stage 11, 13 associated with the motor 5 is subsequently engaged so that a high torque will be available until the final velocity has been reached.

The drive apparent from FIG. 2 differs from the one described with reference to FIG. 1 only in that a gear stage consisting of the gears 16, 17 and serving to decrease the speed of the reciprocating-piston rotary motor 4' is interposed between the reciprocating-piston rotary motor 4' and the shaft 2' of the shiftable transmission. The drive apparent from FIG. 2 permits a desirable operation of a vehicle that is provided with such drive.

Typical control positions are now briefly explained.

When a high starting torque is required, both reciprocating-piston rotary motors 4' and 5' are coupled to the associated first gear stages 8', 12' and 10', 12'. As the velocity increases, the reciprocating-piston rotary motor 4' is tilted toward a zero angle of inclination corresponding to a zero displacement volume. When the reciprocating-piston rotary motor 4' has an angle of inclination near zero and its torque is also zero, a shifting to the second gear stage 9', 13' is effected. After that shifting operation, the reciprocating-piston rotary motor 5' is increasingly tilted toward a zero angle of inclination so that its torque decreases to zero and said reciprocating-piston rotary motor 5' can be coupled to its second gear stage 11', 13', which is used to accelerate to the final velocity, whereas the reciprocating-piston rotary motor 4' can now be tilted toward a position corresponding to a zero displacement volume and the shifting means 6' then effect a shift to an idle position so that the drive is then effected only by the reciprocating-piston rotary motor 5'.

When only a lower starting torque is required, the reciprocating-piston rotary motor 4' may be coupled to the associated second gear stage 9', 13' from the beginning while the reciprocating-piston rotary motor 5' is coupled to the associated first gear stage 10', 12'. The control sequence is reversed to decrease the velocity.

Figure 2:
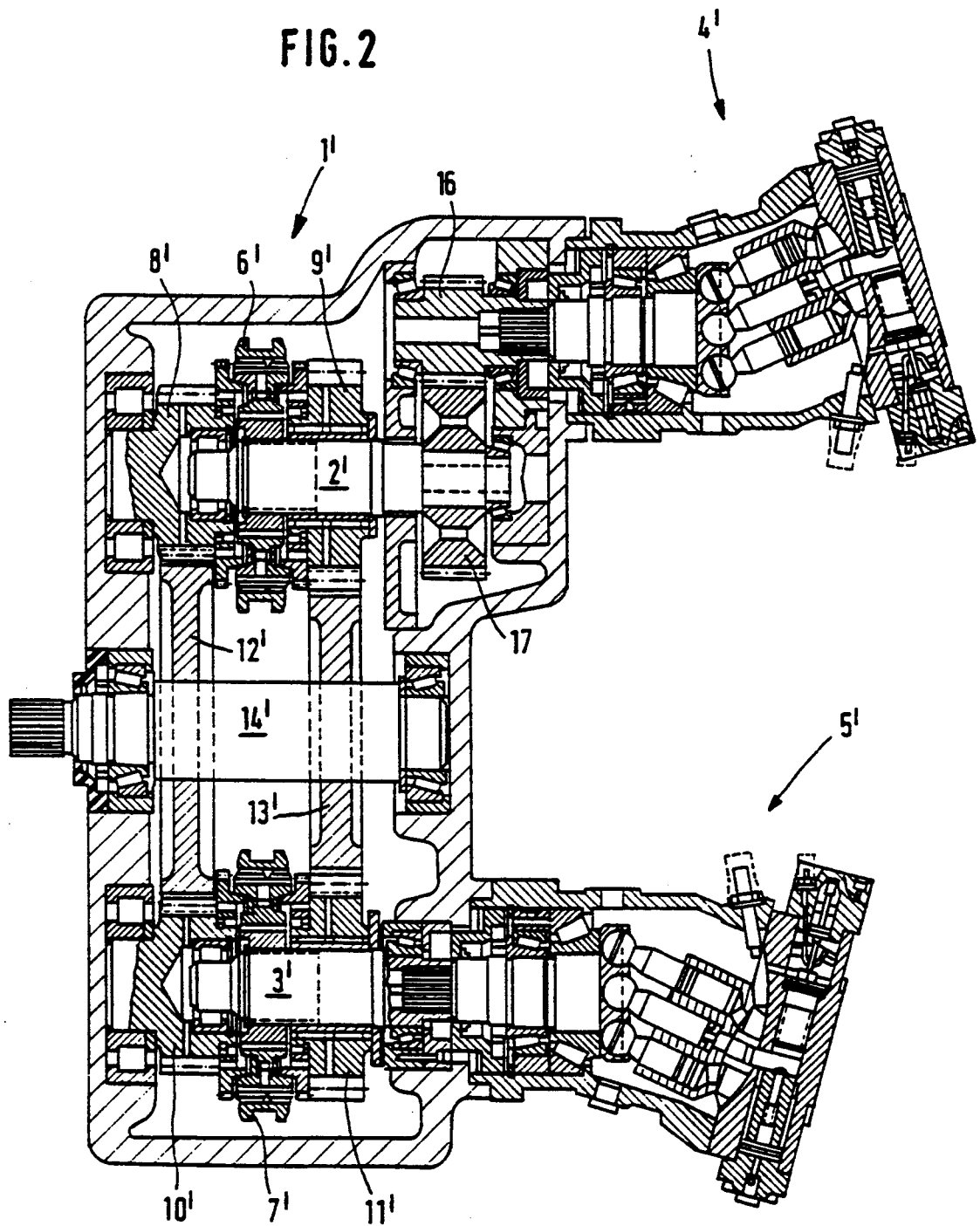
FIG. 2 is a sectional view that is similar to FIG. 1 but shows a spur gear stage between one reciprocating-piston rotary motor and the shaft that carries shiftable gears associated with said motor.
Figure 3:
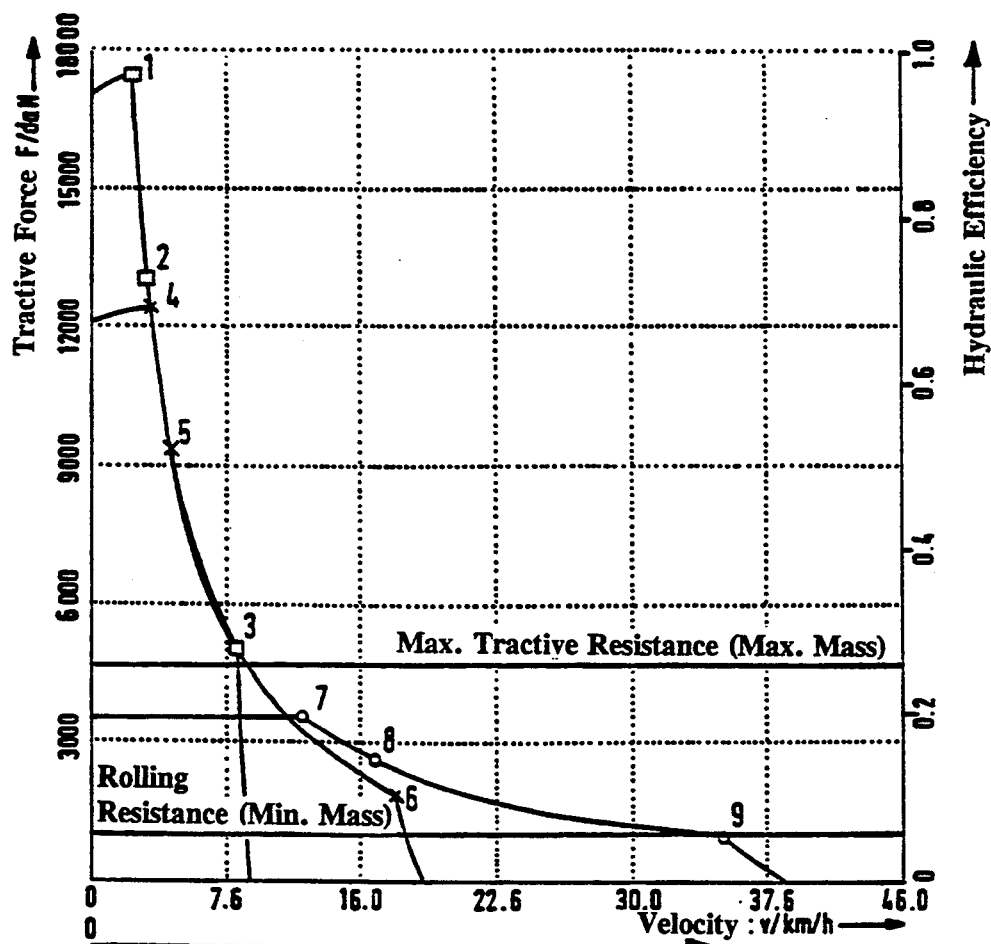
FIG. 3 is a tractive force-velocity graph for a vehicle drive comprising a transmission as shown in FIG. 2.

FIG. 3 is a tractive force-velocity graph and a speed-torque graph for the drive shown in FIG. 2. It is apparent from said graphs that an almost infinite travel characteristic can be achieved.

Figure 4:
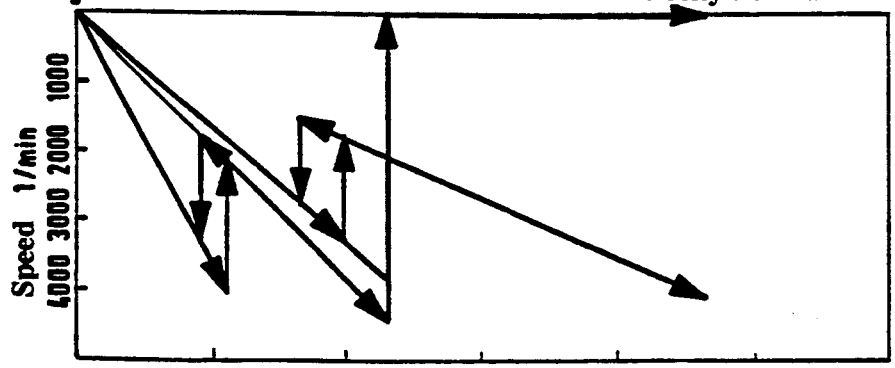
FIG. 4 is a speed-velocity graph corresponding to FIG. 3.

FIG. 4 constitutes the associated speed-velocity graph. The lower curves represent the speed of the reciprocating-piston rotary motor 4' when it is coupled to the two associated gear stages 8', 12' and 9', 13'. The two upper curves relate to the reciprocating-piston rotary motor 5' when it is coupled to the associated gear stages 10', 12' and 11', 13'.

From the graph shown as FIG. 4, it is also apparent that the shifting times for accelerating and decelerating are interrelated by a hysteresis so that a frequent shifting to an undefined shift position will be avoided.

I claim:

1. A hydrostatic drive comprising two reciprocating-piston rotary motors, said motors having an angle of inclination adapted to be controlled to decrease toward zero as the torque decreases and velocity increases, and each motor being separately coupled to an input shaft of a shiftable transmission, each input shaft being adapted to be coupled to a common output shaft by means of one of at least two shiftable gear stages.

2. A drive according to claim 1, wherein the reciprocating-piston rotary motors are of inclined-axis type or of inclined-disk type.

3. A drive according to claim 1, wherein at least one transmission stage is provided between the input shaft of the transmission and the shaft which carries shiftable gears.

4. A drive according to claim 1, wherein the two reciprocating-piston rotary motors are coupled to each other by means for preventing simultaneous tilting of the two motors almost to a zero angle of inclination.

5. A drive according to claim 1, wherein the shiftable transmission is shifted by an axial shifting of gears which are adapted to be coupled.

6. A drive according to claim 1, wherein the shiftable transmission is shifted by multiple-disk couplings.

7. A drive according to claim 1, further comprising control means for controlling the angle of inclination of the reciprocating-piston rotary motors dependent on speed and/or pressure.

8. A drive according to claim 1, further comprising shifting means for controlling the shifting of the gear stages dependent on speed and/or torque.

* * * * *